(12) United States Patent
Le Rouzic et al.

(10) Patent No.: US 11,223,658 B2
(45) Date of Patent: Jan. 11, 2022

(54) METHOD FOR PRIORITISING MEDIA STREAMS IN A COMMUNICATIONS NETWORK

(71) Applicant: Orange, Issy-les-Moulineaux (FR)

(72) Inventors: Jean-Claude Le Rouzic, Trebeurden (FR); José Doree, Lannion (FR)

(73) Assignee: ORANGE, Issy-les-Moulineaux (FR)

( * ) Notice: Subject to any disclaimer, the term of this patent is extended or adjusted under 35 U.S.C. 154(b) by 618 days.

(21) Appl. No.: 15/562,742

(22) PCT Filed: Mar. 16, 2016

(86) PCT No.: PCT/FR2016/050584
§ 371 (c)(1),
(2) Date: Feb. 14, 2018

(87) PCT Pub. No.: WO2016/156694
PCT Pub. Date: Oct. 6, 2016

(65) Prior Publication Data
US 2018/0176265 A1    Jun. 21, 2018

(30) Foreign Application Priority Data
Mar. 31, 2015 (FR) .................................. 1552771

(51) Int. Cl.
*H04L 29/06* (2006.01)

(52) U.S. Cl.
CPC ...... *H04L 65/1006* (2013.01); *H04L 65/1016* (2013.01); *H04L 65/1069* (2013.01); *H04L 65/60* (2013.01); *H04L 65/80* (2013.01)

(58) Field of Classification Search
CPC ..... H04L 65/1016; H04L 65/80; H04L 29/06; H04L 65/1006; H04L 65/1069; H04L 65/60
See application file for complete search history.

(56) References Cited

U.S. PATENT DOCUMENTS 7,587,031 B1 * 9/2009 Ress ................... H04M 3/18
                                                    370/271
9,294,526 B2 * 3/2016 George ............ H04N 21/44209
(Continued)

FOREIGN PATENT DOCUMENTS

| EP | 1331785 A1 | 7/2003 | |
| WO | 0167675 A2 | 9/2001 | |
| WO | WO-2012042150 A1 * | 4/2012 | ......... H04L 65/1016 |

OTHER PUBLICATIONS

Dong Sun Lucent Technologies USA. "Proposed Editorial Changes for RACF (FGNGN-OD-00241); D 372." ITU-IT Draft Study Period 2005-2008, International Telecommunication Union, Geneva; CH, vol. Study Group 13. Jan. 16, 2006.
(Continued)

*Primary Examiner* — Jason D Recek
(74) *Attorney, Agent, or Firm* — David D. Brush; Westman, Champlin & Koehler, P.A.

(57) ABSTRACT

A method of prioritizing a media stream belonging to a plurality of media streams associated with a communication session. The method includes: a first control entity generating or obtaining from a session control message priority information giving a relative priority to the stream within the session relative to the other streams of the plurality of media streams; and a second control entity inserting the priority information into a resource control message for sending to a media entity.

18 Claims, 3 Drawing Sheets

(56) References Cited

U.S. PATENT DOCUMENTS

| | | | | |
|---|---|---|---|---|
| 2003/0002477 | A1* | 1/2003 | Israel | H04M 3/562 370/352 |
| 2005/0237931 | A1* | 10/2005 | Punj | H04L 29/06027 370/229 |
| 2007/0206620 | A1* | 9/2007 | Cortes | H04L 29/06027 370/412 |
| 2007/0253412 | A1* | 11/2007 | Batteram | H04L 29/06027 370/389 |
| 2008/0013544 | A1* | 1/2008 | Ginde | H04L 29/06027 370/395.21 |
| 2008/0089324 | A1* | 4/2008 | Polk | H04L 65/608 370/389 |
| 2009/0116477 | A1* | 5/2009 | Belling | H04L 29/06027 370/386 |
| 2009/0274146 | A1* | 11/2009 | Zhu | H04L 29/12528 370/352 |
| 2010/0121963 | A1* | 5/2010 | Peng | H04N 21/643 709/228 |
| 2010/0128722 | A1 | 5/2010 | Madour et al. | |
| 2010/0146085 | A1* | 6/2010 | Van Wie | H04L 12/00 709/220 |
| 2010/0150141 | A1* | 6/2010 | Lee | H04M 7/0072 370/352 |
| 2011/0211586 | A1* | 9/2011 | Zhu | H04L 65/1043 370/401 |
| 2011/0268128 | A1* | 11/2011 | Aberg | H04L 29/06238 370/401 |
| 2012/0224564 | A1* | 9/2012 | Paisal | H04N 7/148 370/331 |
| 2013/0010049 | A1* | 1/2013 | Mostafa | H04N 7/15 348/14.01 |
| 2013/0091526 | A1* | 4/2013 | Iyer | H04L 65/608 725/62 |
| 2013/0275615 | A1* | 10/2013 | Oyman | H04L 65/60 709/231 |
| 2013/0315229 | A1* | 11/2013 | Noldus | H04L 29/06176 370/352 |
| 2014/0092783 | A1* | 4/2014 | Pulicherla | H04L 12/6418 370/260 |
| 2014/0112130 | A1* | 4/2014 | Yang | H04L 49/25 370/230 |
| 2014/0126715 | A1* | 5/2014 | Lum | H04M 3/5133 379/265.09 |
| 2014/0201329 | A1* | 7/2014 | Himayat | H04N 21/6131 709/219 |
| 2014/0219088 | A1* | 8/2014 | Oyman | H04N 21/23439 370/231 |
| 2014/0244798 | A1* | 8/2014 | Prabhu | H04L 65/608 709/219 |
| 2015/0172349 | A1* | 6/2015 | Gonzalez De Langarica | H04L 65/1016 709/219 |
| 2016/0072868 | A1* | 3/2016 | Poulin | H04L 65/605 709/219 |
| 2016/0261517 | A1* | 9/2016 | Kohiga | H04L 67/322 |
| 2016/0294913 | A1* | 10/2016 | Jansson | H04L 67/02 |
| 2017/0111401 | A1* | 4/2017 | Le Razavet | H04L 65/1046 |
| 2017/0187620 | A1* | 6/2017 | Kielhofner | H04L 45/741 |

OTHER PUBLICATIONS

Guenkova-Luy et al. "End-to-End Quality-of-Service Coordination for Mobile Multimedia Applications." IEEE Journal on Selected Areas in Communications, IEEE Service Center, Piscataway, US, vol. 22, No. 5. Jun. 1, 2004.

J. Rosenberg et al. "SIP: Session Initiation Protocol." Network Working Group, Request for Comments: 3261. Jun. 2002.

J. Rosenberg et al. "An Offer/Answer Model with the Session Description Protocol (SDP)." Network Working Group, Request for Comments: 3264. Jun. 2002.

P. Calhoun et al. "Diameter Network Access Server Application." Network Working Group, Request for Comments: 4005. Aug. 2005.

H. Schulzrinne et al. "Communications Resource Priority for the Session Initiation Protocol (SIP)." Network Working Group, Request for Comments: 4412. Feb. 2006.

M. Handley et al. "SDP: Session Description Protocol." Network Working Group, Request for Comments: 4566. Jul. 2006.

M. Garcia-Martin, Ed. et al. "Diameter Session Initiation Protocol (SIP) Application." Network Working Group, Request for Comments: 4740. Nov. 2006.

"Universal Mobile Telecommunications System (UMTS); Policy and charging control over Rx reference point (3GPP TS 29.214 version 7.4.0 Release 7)". ETSI TS 129 214 V7.4.0. Apr. 2008.

International Search Report and Written Opinion dated May 16, 2016 for International Application No. PCT/FR2016/050584.

English Translation of the International Search Report and Written Opinion dated May 16, 2016 for International Application No. PCT/FR2016/050584.

* cited by examiner

METHOD FOR PRIORITISING MEDIA STREAMS IN A COMMUNICATIONS NETWORK

FIELD OF THE DISCLOSURE

The invention lies in the field of managing media streams during a communication session, and it relates more particularly to a method of prioritizing media streams associated with a multimedia communication session between two entities.

BACKGROUND OF THE DISCLOSURE

Several stream management methods are known in the prior art. In Internet protocol (IP) type networks, it is known in particular to combine the session description protocol (SDP) as defined in document RFC 4566 of the Internet engineering task force (IETF) with the session initiation protocol (SIP) as defined in document RFC 3261 likewise by the IETF, so as to set up, modify, or indeed terminate a multimedia communication session between two entities. In particular, the SDP protocol makes it possible to describe a set of data streams associated with one such multimedia communication session.

IETF document RFC 3264 entitled "An offer/answer model with the session description protocol" also describes a mechanism enabling two entities to use the SDP protocol in order to negotiate parameters relating to desired data streams for a session that is to be set up or modified. In that model, in order to set up or modify a session, a first entity submits an offer to a second entity, which offer is referred to as an "SDP offer" and is in the form of a session description. The offer comprises a list of media stream descriptions specifying, for each stream, in particular a type of medium (audio, video, text), a destination port number, a transport protocol, or indeed encoding information. The entity that submits the offer can thus inform the entity to which the offer is sent about the various media and characteristics (e.g. type of coding) associated therewith that it is capable of handling. The destination entity of the offer, e.g. as a function of the media and the codings that it is capable of handling, accepts the offer by sending an answer referred to as an "SDP answer" informing the entity that sent the offer about the media streams that it is capable of handling. The destination entity of the offer can also send a new offer to the first entity, e.g. corresponding to other media that it desires to add to the session. The two entities are thus equally capable of acting as the sender of an offer and as the destination of an offer. That offer/answer mechanism is also equally applicable to communication sessions involving more than two participants (e.g. a video conference having more than two participants).

When the network is saturated, the media streams as negotiated in this way while setting up or modifying a multimedia communication session are likely to be processed on a priority basis by an entity of the network. To do that, document RFC 4412, entitled "Communications resource priority for the session initiation protocol (SIP)" defines a "resource-priority" SIP header enabling a SIP request to be identified as requesting priority access to certain network resources (e.g. network gateways, routers, SIP proxies). The "resource-priority" SIP header field contains one or more domain names. When an entity of a control plane of the network receives an SIP message including the "resource-priority" SIP header, it verifies that the message is valid, and it identifies the services associated with the domain names of the "resource-priority" SIP header field. When the resources are saturated, the entity can preempt the other ongoing communication sessions that are not associated with an identified domain name, or it can put the SIP request including the "resource-priority" header field into a queue of requests for priority treatment. The mechanism described in document RFC 4412 thus makes it possible to give priority treatment to a communication session, and indirectly to all of the media streams associated with that session. Nevertheless, that priority is identical for all of the media streams associated with the session. Specifically, the mechanism described does not make it possible to specify relative priorities between streams of a given session.

Specification document TS 129 214 v.7.4.0 by the European Telecommunications Standards Institute (ETSI) entitled "Universal mobile telecommunications system (UMTS); policy and charging control over Rx reference point" also describes a mechanism enabling priority to be given to an IP stream within an application session between an application function (AF) application entity and a policy and charging rule function (PCRF) entity via a "reservation-priority" attribute inserted in a Diameter message. This attribute makes it possible, in a stream descriptor, to specify a relative priority for that stream within a session in which the stream is associated. Nevertheless, the prior art does not make provision for a mechanism enabling the application entity to determine or to be informed about the existence of a priority for the stream within the session relative to any possible other streams of the session. The priority of a stream within a session is unknown to the controlled entities of the network, which means that they cannot take account of the importance of one stream relative to other streams in a single session, e.g. in the event of network congestion, nor can they transmit such information to other entities of the network. End-to-end processing of the priority of a stream is thus impossible, at present.

SUMMARY

One of the objects of the invention is to remedy the insufficiencies/drawbacks of the prior art and/or to provide improvements thereto.

In a first aspect, the invention provides a method of prioritizing a media stream belonging to a plurality of media streams associated with a communication session, the method comprising:
 a first control entity generating or obtaining from a session control message priority information giving a relative priority to the stream within the session relative to the other streams of the plurality of media streams; and
 a second control entity inserting the priority information into a resource control message for sending to a media entity.

The prioritization method thus enables the control entity to obtain priority information relating to a media stream associated with a session from a session control message. By way of example, the message may relate to a session between a calling entity and a called entity, and it may be received from the calling entity, the called entity, or indeed from an intermediate entity of the network situated on a network path between the calling entity and the called entity. The method advantageously makes it possible to transmit priority information from such an entity to the control entity. The message may also be generated directly by the control entity. This applies in particular when the control entity is a user terminal. End-to-end processing is thus made available for this information from the entity sending the session control message or from the control entity, as the case may be, to the media entity that receives the resource control message sent by the control entity.

By means of the method, it is thus possible for an entity sending the session control message, or for an entity generating such a message, to propose a priority for each of the media streams associated with the session. Numerous policies for prioritizing media streams associated with a session can thus be implemented on being received or sent by the control entity.

By way of example, in the event of network congestion, the method makes it possible to preempt a particular media stream to the advantage of other media streams associated with the session. The method also makes it possible to give precedence to sending a particular stream depending on its type. By way of example, the method makes it possible to process a remote monitoring video stream marked with high priority in the session control message with precedence over other streams (e.g. video and audio streams of a video conference) of the session that are marked with lower priority. Likewise, by way of example, the method makes it possible to take account of a low priority associated with an audio stream of a video conference that is being held by the network control entity while using sign language between participants who are hard of hearing.

According to a particular characteristic, the method further comprising modifying the priority information prior to inserting it in the resource control message.

The method thus enables the control entity to intervene directly on the respective priorities allocated to the streams of the session. By way of example, these priorities may be redefined or deleted by the control entity as a function of information about the streams (e.g. content of the streams, user of the streams, source of the streams) or indeed information about the network.

In the above-mentioned example of an audio stream for a video conference being held in sign language between participants who are hard of hearing, zero priority may be advantageously associated with the audio stream by the network control entity. A network media entity that receives the resource control message containing priority information as modified in this way can thus decide not to transmit this stream. This can also have the consequence of releasing network resources.

Modifying the priority information by means of the control entity also makes it possible to protect the network from the effects of prioritizing one or more streams received from an entity that is not a trusted entity and that is sending the session control message (which effects might include saturation of the network). The method makes it possible in particular to prevent or to redefine the priorities of certain streams prior to transmitting the priority information to other network entities by means of the resource control message.

According to a particular characteristic, the priority information is an attribute of a description of the stream contained in an SDP offer or answer associated with the session control message.

Obtaining the priority information from an SDP offer or answer enables the method to be implemented in particularly easy manner. In particular, an SDP message may easily be encapsulated in a control message of a higher protocol layer using the SDP protocol. There is no need to make provisions for extensions to such a protocol in order to implement the method. For a control entity of the media gateway control function (MGCF) type communicating with a media entity of the IP multimedia subsystem-media gateway (IMS-MGW) type using the H.248 protocol, it is possible by way of example to incorporate the SDP offer or answer containing the priority information directly in an H.248 resource control message, whereas in the prior art, only the Diameter protocol makes it possible to indicate the relative priority of a stream within a session relative to other streams in a plurality of streams associated with the session. This ensures that the method is compatible with numerous protocols.

In addition, using an attribute to indicate the priority associated with a stream directly in the description of that stream contained in the SDP offer or answer makes this information more easily readable.

According to a particular characteristic, the streams belong to a plurality of media streams respectively associated with a stream description for the communication session. The stream descriptions are ordered in an SDP offer or answer associated with the session control message, and the priority information is an ordered list of values contained in a header of the session control message, in which the order corresponds to the order of the stream descriptions in the SDP offer or answer. The values then give a relative priority for each of the streams within the session according to the order of the list.

Obtaining the priority information from a session control message header enables all of the priorities relating to the streams of a session to be grouped together in a single location. In particular, it is possible to predetermine the priorities of the streams described in an SDP offer or answer without prior analysis of the SDP offer or answer.

In addition, there is no need to provide a specific attribute in the SDP offer or answer in order to give a relative priority to a stream. The method can thus be implemented with entities that generate SDP messages using known techniques.

According to a particular characteristic, said session control message is an SIP message.

In a second aspect, the invention relates to a control entity in a communication network, which entity is referred to as a "secondary" control entity and is arranged to prioritize a media stream belonging to a plurality of media streams associated with a communication session. The control entity comprises:
- an obtaining module and/or a generator module, arranged to obtain from a session control message, or to generate, priority information giving a relative priority to the stream within the session relative to the other streams of the plurality of media streams; and
- an insertion module arranged to insert the priority information in a resource control message for sending to a media entity.

According to a particular characteristic, the control entity of the second aspect further comprises a modification module arranged to modify the priority information prior to it being inserted in said resource control message by the insertion module.

According to a particular characteristic, the obtaining module is arranged to obtain the priority information from an SDP offer or answer contained in the session control message. The priority information is then an attribute of a description of the stream contained in the SDP offer or answer.

According to a particular characteristic, the control entity according to the second aspect comprises a receiver module that is arranged to receive a session control message containing an SDP offer or answer, said SDP offer or answer containing an ordered list of descriptions of the streams associated with the session, and the obtaining module is arranged to obtain the priority information from a header of the session control message, the priority information being an ordered list of values contained in the header, the list being ordered in the same order as the stream descriptions associated with the session. The control entity further comprises a determination module arranged on the basis of the ordered list of values and of the ordered list of descriptions of the streams associated with the session to determine a relative priority for each of the streams within the session according to the order of the lists.

In a third aspect, the invention provides a control entity in a communication network, which entity is referred to as a "primary" control entity, implements session control signals and comprises:

a generator module arranged to extract priority information from a session control message and to modify it, or to generate priority information giving a relative priority for a stream within a communication session relative to other streams of a plurality of media streams associated with the session; and an insertion module arranged to insert the information in a session control message for sending to another control entity, referred to as a "secondary" control entity.

In a fourth aspect, the invention provides a media entity in a communication network, arranged to extract priority information from an H.248 resource control message received from a control entity according to any of the characteristics of the second aspect, which priority information gives a relative priority of a stream within a communication session relative to other streams of a plurality of media streams associated with said session.

The advantages specified for the prioritization method of the first aspect are directly transposable to the control entities of the second and third aspects, and also to the media entity of the fourth aspect.

In a fifth aspect, the invention also provides a program for a control entity including program code instructions for controlling the execution of steps of the above-described prioritization method when the program is executed by the control entity, and a computer-readable data medium storing a computer program including program code instructions for executing steps of the above-described prioritization method.

BRIEF DESCRIPTION OF THE DRAWINGS

The invention can be better understood from the following description of particular embodiments given with reference to the accompanying drawings, in which.

DETAILED DESCRIPTION OF ILLUSTRATIVE EMBODIMENTS

Figure 1:
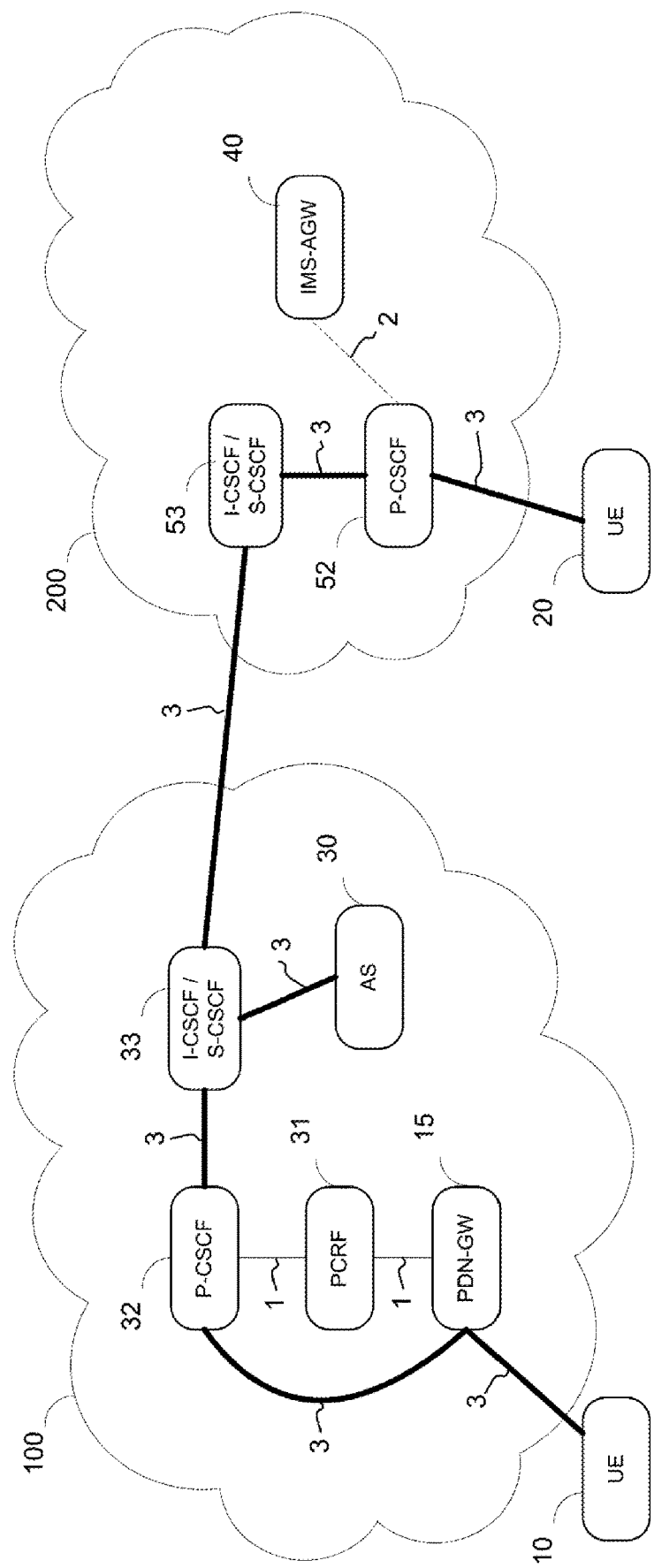
FIG. 1 shows two IP multimedia subsystem (IMS) communication networks in a particular embodiment.

FIG. 1 shows two IMS communication networks 100 and 200 in which control entities of the invention implement a method of prioritizing one or more media streams associated with a session between a calling user terminal 10 and a called user terminal 20. An IMS network architecture as defined by the third generation partnership project (3GPP) standards group enables multimedia sessions to be set up and controlled between user terminals, and also enables resources to be reserved for the multimedia streams in a data transport network. By means of this architecture, network operators can conveniently control the quality of service on offer. The IMS architecture makes it possible to offer services of the telephony, video phone, presence, instant messaging, or television type, and it also manages interactions between such services. It generally implements the session initiation protocol (SIP) as defined by the Internet engineering task force (IETF) in document RFC 3261 as its session management protocol, making it possible to set up, modify, and terminate multimedia sessions in a network using the IP protocol.

The communication network 100 comprises more particularly control entities 30-33, and an entity 15 that is both a media entity and a control entity. Likewise, the communication network 200 comprises control entities 52, 53, and a media entity 40. Control entities and media entities are respectively entities suitable for processing signaling messages relating to a communication session and entities suitable for processing the transport of data relating to a communication session. Control entities are said to belong to a control plane, while media entities are said to belong to a media plane.

By way of example, the control entity 30 is an application server (AS), the control entity 31 is a policy control and charging rules function (PCRF) control entity, the control entities 32 and 52 are proxy call server control function (P-CSCF) servers, the control entities 33 and 53 are entities combining interrogating-call server control functions (I-CSCFs) and serving-call server control functions (S-CSCFs), the entity 15 that is both a media entity and a control entity is a packet data network-gateway (PDN-GW) and the media entity 40 is an IMS-access gateway (IMS-AGW).

The network entities are implemented to manage the communication session between the calling user terminal 10 and the called user terminal 20. The calling user terminal 10 is a subscriber to the communication network 100 which it accesses via the PDN-GW gateway 15. The called user terminal 20 is a subscriber to the communication network 200.

In the embodiment described, the control entity 32 serves as a connection entity between the communication core network 100 and the access network used by the calling user terminal 10, and is suitable for relaying all signaling messages between the calling user terminal 10 and the control entity 33.

The control entity 33 serves in particular to interrogate a subscriber server (not shown) in order to manage the procedure for registering the calling user terminal 10. It also serves to make requests to the control entity 30 for one or more services associated with the communication session.

The control entity 31 is in charge of adapting and controlling the use of network resources of the communication network 100 by providing control rules for the session, e.g. as a function of the services required by the calling user terminal 10 or by its subscriber profile.

The control entity 52 has a role equivalent to that of the control entity 32, but in the communication network 200. It serves as a connection entity between the communication core network 200 and the access network used by the called user terminal 20, and it is suitable for relaying all signaling messages between the called user terminal 20 and the control entity 53. The control entity 52 also communicates with the media entity 40.

The control entity 53 has a role that is equivalent to that of the control entity 33, but in the communication network 200. In particular, it serves to interrogate a subscriber server (not shown) in order to manage the procedure of registering the called user terminal 20.

The exchanges respectively between: the calling user terminal 10 and the PDN-GW gateway 15; the PDN-GW gateway 15 and the control entity 32; the control entity 32 and the control entity 33; the control entity 33 and the control entity 30; the control entity 33 and the control entity 53; the control entity 53 and the control entity 52; and the control entity 52 and the called user terminal 20; are all SIP signaling messages 3.

The exchanges firstly between the control entity 31 and the control entity 32, and secondly between the PDN-GW gateway 15 and the control entity 31 are conveyed by Diameter signaling messages 1, as defined in IETF document RFC 4740.

The exchanges between the control entity 52 and the media entity 40 are conveyed by signaling messages 2 in compliance with the H.248 protocol as defined by the ITU-T workgroup of the International Telecommunication Union (ITU).

The prioritization method is implemented more particularly by the control entities 30 and 52, which are referred to below respectively as the "primary" control entity and as the "secondary" control entity. This is described in detail below with reference to FIG. 2.

It should also be observed that FIG. 1 is a simplified representation of the communication networks 100 and 200. No limitation should be attached to the number of control entities and media entities belonging to the communication networks 100 and 200.

In another network configuration, some of the control entities may also be grouped together within a single entity. Likewise, some of the functions performed by a single entity may be separated and implemented by distinct entities. This applies for example to the I-CSCF interrogation functions and the S-CSCF registration functions of the control entities 33 and 53.

Figure 2:
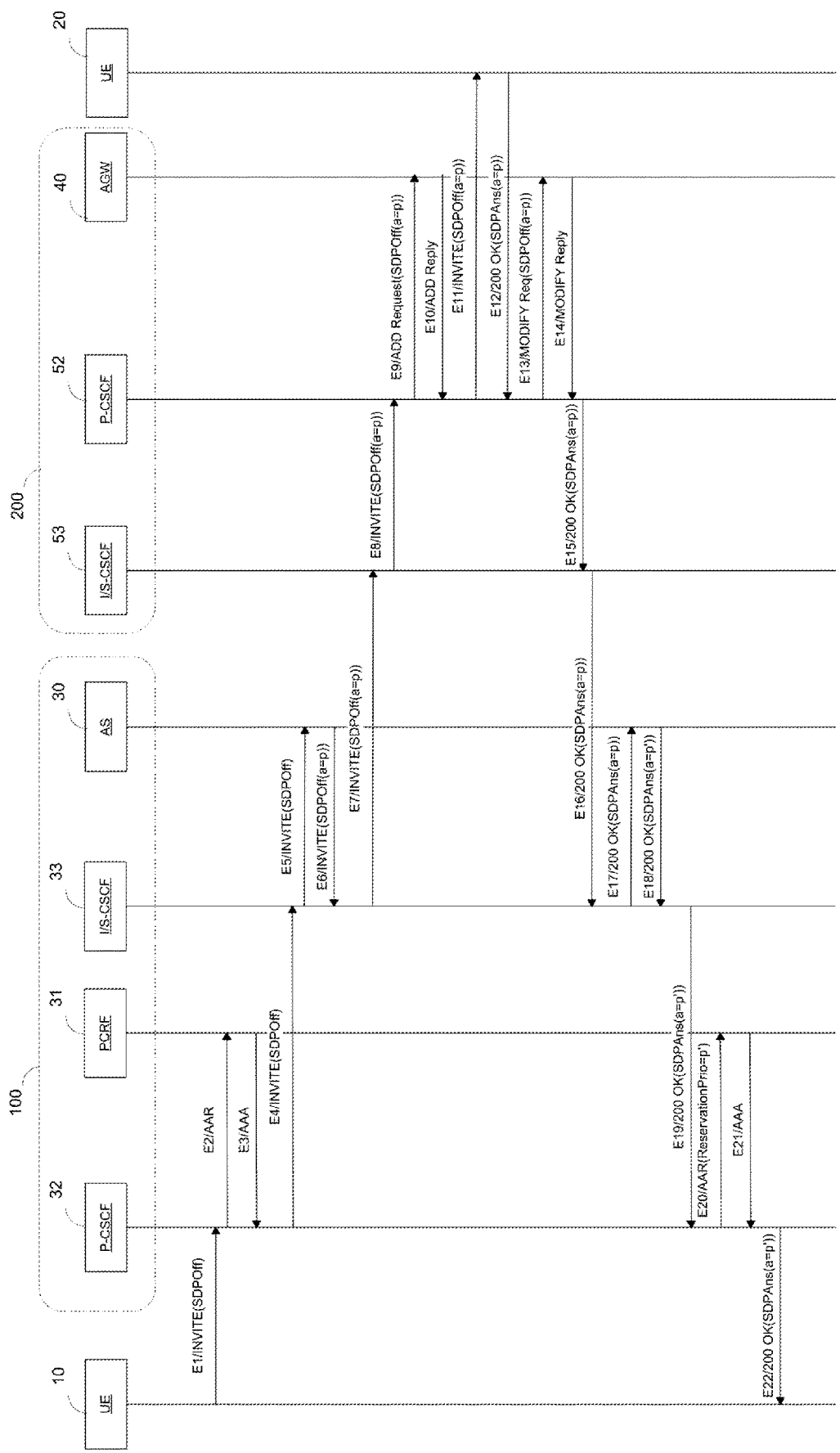
FIG. 2 shows steps of a method of prioritizing a media stream as implemented in entities of an IMS communication network in a particular embodiment.

FIG. 2 shows steps of a method of prioritizing a media stream as implemented by entities of an IMS communication network in a particular embodiment. Below, the network configuration is as described above with reference to FIG. 1.

During a step 0, the calling user terminal 10 sends an "INVITE" SIP session control message containing an SDP offer destined to the communication network 200 to which the called user terminal 20 is a subscriber. The purpose of this message is to set up a communication session between the calling user terminal 10 and the called user terminal 20. The "INVITE" SIP session control message may for example have the following contents:

```
INVITE sip:user1@operator1.com SIP/2.0
To: <sip:user1@operator1.com>
From: <sip:user2@operator2.com>;tag=786
Call-ID: 3413an89KU
Contact : <sip :...> ; +VideoConferenceWithSubtitles
Content-Type: application/sdp
...
...
c=IN IP4 hostuser2.operator2.com
t=0 0
m=audio 49170 RTP/AVP 8
```

-continued

```
a=rtpmap:8 PCMU/8000
...
m=video 51372 RTP/AVP 31
a=rtpmap:31 H261/90000
...
m=message 51789 TCP/MSRP *
 a=accept-types:text/plain
 a=path:msrp://host.operator2.com:7394/2s93i9ek2a;tcp
...
```

A header of the "INVITE" SIP session control message specifies more particularly that the communication session which the calling user terminal 10 seeks to set up is a video conference session with subtitles. This is specified by the "contact" header of the "INVITE" SIP session control message having the value "VideoConferenceWithSubtitles".

The SDP offer contained in the "INVITE" SIP session control message also includes three multimedia stream descriptions, each identified by the letter "m". The first description describes an audio stream, the second describes a video stream, and the third describes an instant messaging stream.

At this stage, it should be observed that the "INVITE" SIP session control message does not contain any information about a priority for streams associated with the communication session.

During a step E2, the control entity 32 (a P-CSCF proxy server) receives the "INVITE" session control message sent by the calling user terminal 10. The control entity 32 then sends a media stream reservation request for the three media streams of the SDP offer to the control entity (the PCRF rules control entity). The request to reserve media streams is more precisely an AA-request (AAR) Diameter resources control message as defined in document RFC 4005.

In a step E3, the control entity 31 sends the control entity 32 a message acknowledging the request to reserve streams. This acknowledgment message is an AA-answer (AAA) Diameter resources control message as defined in document RFC 4005.

During a step E4, the control entity 32 relays the "INVITE" SIP session control message to the control entity (the entity supporting the I-CSCF interrogation function and the S-CSCF registration function).

During a step E5, the control entity 33 receives the "INVITE" SIP session control message and from the "contact" header containing the value "VideoConferenceWithSubtitles" it determines that a video conference with subtitles is to be implemented. This service is provided by the primary control entity 30 (application server AS), and by way of example consists in using an instant messaging stream to subtitle in real time the speech of a called user of the called user terminal 20, and to do so in the language of a calling user of the calling user terminal 10. By way of example, the language of the calling user is determined from that user's subscriber profile as obtained from a home subscriber server (HSS). The control entity 33 then transmits the "INVITE" SIP session control message to the primary control entity 30.

During a step E6, the primary control entity 30 receives the "INVITE" SIP session control message and identifies the three media streams contained in the SDP offer. A policy for prioritizing streams that is local to the primary control entity 30 specifies that for this subtitled video conference service, a video stream has lower priority than an audio stream, which stream itself has priority that is lower than the priority of an instant messaging stream associated with real-time subtitles. The primary control entity 30 applies the prioritizing policy to the media streams contained in the SDP offer. For this purpose, the primary control entity 30 generates priority information specifying a relative priority for each of the media streams within the session compared with the other streams associated with the session. More precisely, the primary control entity 30 inserts an attribute a=p into each of the descriptions of the audio stream, the video stream, and the instantaneous messaging stream, which attributes are given respective values of 1, 0, and 2. The value "0" corresponds to the lowest priority for a stream. The priority information thus indicates that the video stream has the lowest priority, that the audio stream has priority higher than that of the video stream, and that the instant messaging stream benefits from priority higher than both of the other streams of the session. The "INVITE" SIP session control message then contains a new SDP offer. The resulting "INVITE" SIP session control message may have the following content, for example:

```
INVITE sip:user1@operator1.com SIP/2.0
To: <sip:user1@operator1.com>
From: <sip:user2@operator2.com>;tag=786
Call-ID: 3413an89KU
Content-Type: application/sdp
...
    ...
    m=audio 24567 RTP/AVP 8
    a=prio:1
    a=rtpmap:8 PCMU/8000
    ...
    m=video 26547 RTP/AVP 31
    a=prio:0
    a=rtpmap:31 H261/90000
    ...
    m=message 27564 TCP/MSRP *
    a=prio:2
    a=accept-types:text/plain
     a=path:msrp://gw1.operator2.com:7394/2s93i9ek2a;tcp
    ...
```

Once the information has been generated and inserted in the "INVITE" SIP session control message, the primary control entity 30 stores it while waiting for an SDP response, and it returns the "INVITE" SIP session control message to the control entity 33.

During a step E7, the control entity 33 routes the "INVITE" SIP session control message to the called user terminal 20 via the control entity 53 (entity of the communication network 200 supporting I-CSCF interrogation functions and S-CSCF registration functions).

During a step E8, the control entity 53 then routes the "INVITE" SIP signaling control message to the secondary control entity 52 (proxy server of the communication network 200).

During a step E9, the secondary control entity 52 may for example insert the priority information into an "AddRequest" H.248 resource control message and send it to the media entity 40 (IMS-AGW gateway of the communication network 200). By way of example, the "AddRequest" H.248 resource control message is a request to reserve three distinct streams ("stream" in the H.248 resource control message) for each of the media streams of the SDP offer. The description of each of the media streams in the SDP offer containing the priority information is inserted more precisely into the "AddRequest" H.248 resource control message. By way of example, the "AddRequest" H.248 resource control message has the following form:

```
MEGACO/2 [172.20.214.26]:2953
Transaction=14289{
Context=63967{
Add=Term1{
Media{
Stream=1{Local{
...
m=audio ...
a=prio :1
...
}}
Stream=2{Local{
...
m=video ...
a=prio :0
...
}}
Stream=3{Local{
...
m=message ...
a=prio :2
...
}}
...
```

During a step E10, the media entity 40 receives the "AddRequest" H.248 resource control message and from the priority information contained in the message it determines the respective priorities of the media streams within the communication session. The priority information is then known to the media entity 40 which can advantageously make use of it, e.g. by implementing different queues for processing the session streams having different priorities. After processing the "AddRequest" H.248 resource control message, the media entity 40 replies to the secondary control entity 52 by a "AddReply" H.248 resource control message.

During a step E11, the secondary control entity 52 transmits the "INVITE" SIP session control message to the called user terminal 20.

During a step E12, the called user terminal 20 receives the SDP offer containing the priority information. It is thus informed about the priority of each stream associated with the session relative to the other streams. The called user terminal 20 applies one or more stream prioritizing policies that are configured at the level of the terminal. The called user terminal 20 may for example generate a "200 OK" SIP session control message comprising an SDP answer with attributes given values that are identical to those of the received SDP offer. The called user terminal 20 sends this SDP answer to the secondary control entity 52. The content of the "200 OK" SIP session control message may for example be as follows:

```
SIP/2.0 200 OK
To: sip:user1@operator1.com; tag=345
From: <sip:user2@operator2.com>;tag=786
Call-ID: 3413an89KU
Content-Type: application/sdp
...
    ...
    c=IN IP4 hostuser1.operator1.com
    t=0 0
    m=audio 14744 RTP/AVP 8
    a=prio:1
    a=rtpmap:0 PCMU/8000
    m=video 18955 RTP/AVP 31
    a=prio:0
    a=rtpmap:31 H261/90000
    m=message 45646 TCP/MSRP *
    a=prio:2
    a=accept-types:text/plain
```

During a step E13, the secondary control entity 52 receives the SDP answer sent by the called user terminal 20 and sends a "Modify Request" H.248 resource control message to the media entity 40. The "Modify Request" H.248 resource control message serves to inform the media entity 40 of the priorities associated with the session streams as described in the SDP answer. The "Modify Request" H.248 resource control message may for example have the following content:

```
MEGACO/2 [172.20.214.26]:2953
Transaction=14289{
Context=63967{
Modify=Term1{
Media{
Stream=1{Local{
...
m=audio ...
a=prio :1
...
}
Remote{
...
m=audio ...
a=prio :1
...
}}
}
Stream=2{Local{
...
m=video ...
a=prio :0
...
}
Remote {
...
m=audio ...
a=prio :0
...
}}
}
Stream=3{Local{
...
m=message ...
a=prio :2
...
} Remote {
...
m=audio ...
a=prio :2
...
}}
}
...
```

During a step E14, the media entity 40 acknowledges the resource control message received in step E13 by sending a "Modify Reply" resource control message to the secondary control entity 52.

During a step E15, the secondary control entity 52 relays the "200 OK" SIP session control message to the control entity 53, which in turn relays it during a step E16 to the control entity 33 of the communication entity 100.

During a step E17, the control entity 33 transmits the "200 OK" SIP session control message to the primary control entity 30. This entity then has available both the SDP offer stored during step E6 and the corresponding SDP answer obtained from the "200 OK" SIP session control message.

During a step E18, the primary control entity 30 can then update the priority information contained in the SDP answer, should that be necessary. By way of example, this applies when the primary control entity 30 acts on the basis of an element inserted by the called user terminal 20 in the session control message containing the SDP answer in step E12, to determine that the called user of the called user terminal 20 uses a language that turns out to be identical to the language used by the calling user. This stream is then no longer of the same importance for the calling user (ignoring a few exceptions), so the primary control entity 30 modifies the priority information so that the priority of the instant messaging stream becomes less than the priority of the audio stream. For this purpose, the priority associated with the instant messaging stream for real time subtitles of the video conference is decreased by decrementing its value by unity, and the priority associated with the audio stream is increased by incrementing its value by unity. The primary control entity 30 then returns a "200 OK" SIP session control message with an SDP answer including the new priority information.

During a step E19, the control entity 33 transmits the "200 OK" SIP session control message to the control entity 32.

During a step E20, the control entity 32 receives the "200 OK" session control message. The control entity 32 then sends a new media stream reservation request for the three media streams of the SDP answer to the control entity 31. The media stream reservation request, as in step E2, is an "AAR" Diameter resource control message. The "AAR" Diameter resource control message further includes for each media stream of the session a "Reservation Priority" attribute given the new priority values associated with these streams in the SDP answer. The "AAR" Diameter resource control message that is sent may for example be as follows:

```
Diameter Protocol
    Version: 0x01
    Length: ..
    Flags: ...
    Command Code: 265 AA
    ApplicationId: 3GPP Rx (16777236)
    Hop-by-Hop Identifier:
    End-to-End Identifier:
    AVP: Session-Id(263) l=.. f=-...
    AVP: Auth-Application-Id(258) l=.. f=- ..- val=3GPP Rx (16777236)
    AVP: Origin-Host(264) l=.. f=-..- val=..
    AVP: Origin-Realm(296) l=.. f=-..- val=
    AVP: Destination-Host(293) l=.. f=- .. val=
    AVP: Destination-Realm(283) l=.. f=- .. val=...
    AVP: Media-Component-Description(517) l=.. f=..- vnd=TGPP
        AVP Code: 517 Media-Component-Description
        AVP Flags: ..
        AVP Length: ..
        AVP Vendor Id: 3GPP (10415)
        Media-Component-Description:...
            AVP: Media-Component-Number(518) l=.. f=..-
              vnd=TGPP val=1
            AVP: Media-Type(520) l=.. f=..- vnd=TGPP val=AUDIO
            AVP Reservation-Priority(458) l=.. vnd=TGPP
val= PRIORITY-TWO(2).
            ...
            AVP: Media-Component-Number(518) l=.. f=..-
              vnd=TGPP val=2
            AVP: Media-Type(520) l=.. f=..- vnd=TGPP val=VIDEO
            AVP Reservation-Priority(458) l=.. vnd=TGPP
val=DEFAULT(0)
            ...
            AVP: Media-Component-Number(518) l=.. f=..-
              vnd=TGPP val=3
            AVP: Media-Type(520) l=.. f=..- vnd=TGPP val=MESSAGE
            AVP Reservation-Priority(458) l=.. vnd=TGPP
val=PRIORITY-ONE(1).
    ...
```

In a step E21, the control entity 31 sends a message acknowledging the stream reservation request to the control entity 32. As in step E3, this acknowledgment message is an "AAA" Diameter resource control message.

Finally, during a step E22, the control entity 32 transmits the "200 OK" SIP session control message to the calling user terminal 10. This message contains the relative priorities associated with each of the streams of the session, as configured by the primary control entity 30 during step E18. The calling user terminal may optionally reuse locally the priority information contained in the SDP answer in order to implement priority processing of one or more streams relative to the other streams of the session.

In another embodiment, the priority information is inserted directly in the header of an SIP session control message, e.g. in a "Flow-Priority" header, instead of in an SDP offer or answer contained in the message. The priority information then corresponds to an ordered list of values in an order that corresponds to the order of the stream descriptions associated with the session in the SDP offer or answer contained in the SIP session control message. The values of the list then specify a relative priority for each of the streams within the session by the order of the list. More precisely, an $n^{th}$ stream description in an SDP offer or answer corresponds to the $n^{th}$ priority value of the list of values associated with the "Flow-Priority" header. By way of example, in this embodiment, an "INVITE" SIP session control message may have the following form:

```
INVITE sip:user1@operator1.com SIP/2.0
To: <sip:user1@operator1.com>
From: <sip:user2@operator2.com>;tag=786
Call-ID: 3413an89KU
Contact : <sip :...> ; +VideoConferenceWithSubtitles
Flow-Priority : 1,0,2
Content-Type: application/sdp
...
   ...
   c=IN IP4 hostuser2.operator2.com
   t=0 0
   m=audio 49170 RTP/AVP 8
   a=rtpmap:8 PCMU/8000
   ...
   m=video 51372 RTP/AVP 31
   a=rtpmap:31 H261/90000
   ...
   m=message 51789 TCP/MSRP *
   a=accept-types:text/plain
   a=path:msrp://host.operator2.com:7394/2s93i9ek2a;tcp
   ...
```

In another embodiment, in step E12, the called user terminal uses its SDP answer to specify attributes that are given values different from those contained in the SDP offer it received. The called user terminal can thus propose giving priorities to the streams of the session that are different from those proposed or retained by a control entity, or where appropriate by a media entity or a user terminal in either of the networks 100 or 200.

In another embodiment, a priority policy for media streams associated with the session is implemented by the calling user terminal 10, which specifies priority information in the SDP offer sent in step E1. In step E6, and in application of predefined parameters, the primary control entity 30 can then modify the priorities of the media streams described in the SDP offer or can retain the priority information as specified by the calling user terminal 10. Under such circumstances, the primary control entity 30 obtains the priority information specifying relative priorities for said streams within the session compared with the other streams associated with the session, directly from the "INVITE" SIP session control message it has received.

In another embodiment, the primary control entity and the secondary control entity are a single entity. The control entity that obtains the priority information from a session control message, or that generates it, also inserts this priority information into a resource control message.

In another embodiment, the secondary control entity 52 implements an optional step of modifying the priority information prior to inserting it in a resource control message in step E9. By way of example, in the event of network congestion, the priority information is modified in application of an operator policy seeking to give a lower priority to the streams that consume the most bandwidth. Identical processing may also be implemented by the control entity 32 in the communication network 100.

The method is described above for implementing a video conference service with subtitles, however there is no limit on the types of service that can request, initiate, or benefit from prioritizing media streams.

Likewise, the method is described above with an implementation in two communication networks 100 and 200. Nevertheless, there is no limit on the number of communication networks in which the method can be implemented. For example, the method can easily be implemented in a single network for a communication session between terminals that are both subscribers to that network.

Furthermore, there is no limit as to the control entities that might implement the method described. By way of example, such a control entity may belong to the following group of control entities: a proxy call server control function (P-CSCF) entity; an interrogating call server control function (I-CSCF) entity; a serving call server control function (C-CSCF) entity; an application server (AS) entity; a media gateway controller function (MGCF) entity; an interconnection border control function (IBCF) entity; and a user terminal.

Likewise, there is no limit as to the media entities that might implement the method described. By way of example, such a media entity may belong to the following group of media entities: an access gateway (AGW) entity; a core-border gateway function (C-BFG) entity; a PDN gateway (P-GW) entity; a multimedia resource function processor (MRFP) entity; a transition gateway (TrGW) entity; and a user terminal.

The above embodiments are described for processing an "INVITE" SIP session control message and an associated "200 OK" SIP reply message. Nevertheless, there are no limits on the types of service request that can be processed. The processing method that is implemented by way of example for an "UPDATE" SIP request is equivalent to the method implemented for processing an "INVITE" SIP request.

Figure 3:
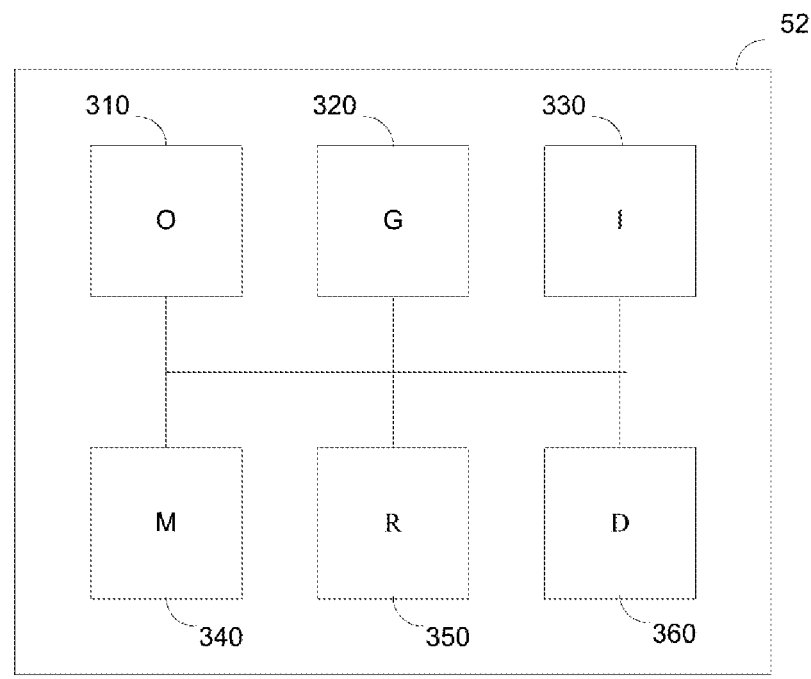
FIG. 3 shows a control entity referred to as a "secondary" control entity, in a particular embodiment.

FIG. 3 shows a secondary control entity 52 arranged to prioritize a media stream belonging to a plurality of media streams associated with a communication session. The secondary control entity 52 comprises:

an obtaining module 310 and/or a generator module 320, arranged to obtain from a session control message or to generate, priority information giving a relative priority to a stream within the session relative to the other streams in the plurality of media streams; and an insertion module 330 arranged to insert said priority information into a resource control message for sending to a media entity.

In a particular embodiment, the control entity also includes a modifier module 340 arranged to modify the priority information prior to it being inserted in the resource control message by the insertion module 330.

In another particular embodiment, the obtaining module 310 is arranged to obtain the priority information from an SDP offer or answer contained in the session control message, the priority information being an attribute of a stream description contained in the SDP offer or answer.

In another particular embodiment, the control entity 52 includes a receiver module 350 arranged to receive a session control message containing an SDP offer or answer. The SDP offer or answer contains an ordered list of descriptions of streams associated with the session. The obtaining module is also arranged to obtain the priority information from a session control message header. The header contains the priority information in the form of an ordered list of values. The values are ordered in the same order as the descriptions of streams associated with the session. The control entity also includes a determination module 360 arranged to use the ordered list of values and the ordered list of descriptions of streams associated with the session to determine a relative priority for each of the streams within the session according to the order of the list.

Figure 4:
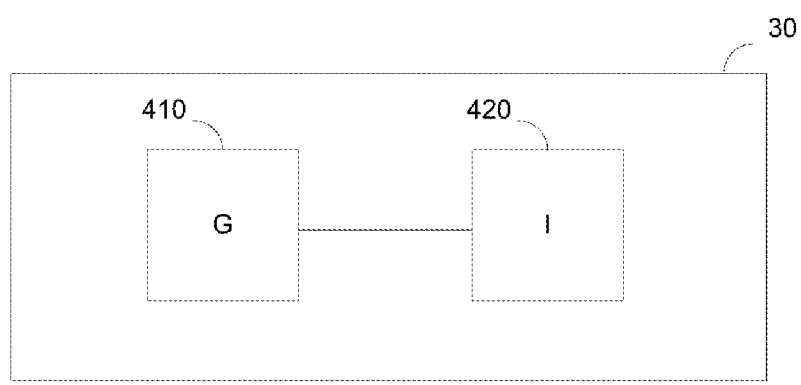
FIG. 4 shows a control entity referred to as a "primary" control entity in a second particular embodiment.

FIG. 4 shows a primary control entity 30 in a communication network. This entity implements session control signals. The control entity 30 comprises:

a generator module 410 arranged to extract priority information from a session control message and to modify it, or to generate such information giving a relative priority to a stream within a communication session relative to the other streams of a plurality of media streams associated with the sessions; and an insertion module 420 arranged to insert the information in a session control message for sending to a secondary control entity.

The invention is implemented by means of software and/or hardware components. On these lines, the term "module" in this document may correspond equally well to a software component, to a hardware component, or to a set of hardware and/or software components, suitable for implementing a function or a set of functions, as described above for the module in question.

A software component comprises one or more computer programs, one or more subprograms of a program, or more generally any element of a program or of software. Such a software component is stored in memory and then loaded and executed by a data processor of a physical entity and is suitable for accessing the hardware resources of the physical entity (memories, storage media, communication bus, input/output electronic cards, user interfaces, etc.).

In the same manner, as hardware component corresponds to any element of hardware. It may be an optionally programmable hardware component, with or without an integrated processor for executing software. By way of example, it may be an integrated circuit, a smart card, an electronic card for executing firmware, etc.

In a particular embodiment, the modules 310, 320, 330, 340, 350, and 360 are arranged to implement the above-described prioritization method. They are preferably software modules comprising software instructions for executing those steps of the above-described prioritization method that are implemented by a secondary control entity. The invention thus also provides:

a program for a secondary control entity including program code instructions for controlling the execution of steps of the above-described prioritization method, when said program is executed by said secondary control entity; and a data medium readable by a secondary control entity and having stored thereon the program for a secondary control entity.

Likewise, the modules 410 and 420 are arranged to implement the above-described prioritization method. The modules are preferably software modules including software instructions to execute those steps of the above-described prioritization method that are implemented by a primary control entity. The invention thus also provides:

a program for a primary control entity including program code instructions for controlling the execution of steps of the above-described prioritization method when said program is executed by said primary control entity; and a data medium readable by a primary control entity and storing the program for a primary control entity.

The software modules may be stored in or transmitted by a data medium. The medium may be a hardware storage medium, e.g. a compact disk read only memory (CD-ROM), a magnetic floppy disk, or a hard disk, or may be a transmission medium such as an electrical, optical, or radio signal, or a telecommunications network.

The invention claimed is:

1. A method of prioritizing in a communication network a plurality of media streams associated with a communication session between a first device and a second device, the method comprising:

a control entity referred to as a secondary control entity receiving a session control message and generating or obtaining from the session control message received by the secondary control entity relative priority information indicating for each media stream of the plurality of media streams a relative priority of said media stream within the communication session relative to the other media streams of said plurality of media streams;

said secondary control entity inserting said relative priority information into a resource control message distinct from the session control message, and sending the resource control message to a media entity of the communication network configured to process transportation of data relating to the communication session; and said secondary control entity relaying the session control message together with the relative priority information towards the second device.

2. The method according to claim 1, further comprising said secondary control entity modifying the relative priority information prior to inserting the relative priority information in said resource control message.

3. The method according to claim 1, wherein said relative priority information is an attribute of a description of said stream contained in a session description protocol (SDP) offer or answer associated with the session control message.

4. The method according to claim 1, wherein said plurality of media streams are respectively associated with stream descriptions for said communication session, said stream descriptions being ordered in a session description protocol (SDP) offer or answer associated with the session control message, and said relative priority information is an ordered list of values contained in a header of said session control message, in which the order corresponds to the order of said stream descriptions in said SDP offer or answer, said values indicating a relative priority for each of the media streams within said communication session according to the order of said list.

5. The method according to claim 1, wherein said session control message is a session initiation protocol (SIP) message.

6. The method according to claim 1 further comprising a primary control entity, distinct from the secondary control entity, inserting said relative priority information in said session control message.

7. The method according to claim 6 further comprising said primary control entity generating said relative priority information prior to inserting the relative priority information in said session control message.

8. The method according to claim 6 further comprising said primary control entity obtaining said relative priority information from a session control message sent by said first device.

9. The method according to claim 8 further comprising said primary control entity modifying said obtained relative priority information before inserting the relative priority information in said session control message.

10. The method according to claim 1 further comprising said media entity of the communication network determining the relative priorities of the media streams of the plurality of media streams within the communication session based on the relative priority information and making use of the relative priorities during the communication session.

11. The method according to claim 1, wherein the resource control message is a message to control resources in a media plane, and the secondary control entity sends the resource control message to the media entity of the communication network, which is configured to process the transportation of data relating to the communication session in the media plane based on the resource control message.

12. The method according to claim 1, wherein the session control message and the resource control message are distinct messages according to different protocols.

13. The method according to claim 1, wherein the resource control message is a message for reserving media flows at the media entity or for updating already reserved media flows at the media entity.

14. The method according to claim 1, wherein, in the relative priority information that is inserted into the resource control message, the relative priorities for at least two of the media streams of the plurality of media streams are distinct.

15. A secondary control entity in a communication network that is arranged to prioritize in a communication network a plurality of media streams associated with a communication session between a first device and a second device, the secondary control entity comprising:
a processor; and
a non-transitory computer-readable medium comprising instructions stored thereon, which when executed by the processor configure the secondary control entity to perform acts comprising:

receiving a session control message and generating or obtaining from the session control message received by the secondary control entity relative priority information indicating for each media stream of the plurality of media streams a relative priority of said media stream within the communication session relative to the other media streams of said plurality of media streams;
inserting said relative priority information in a resource control message for sending to a media entity of the communication network configured to process transportation of data relating to the communication session; and
relaying the session control message together with the relative priority information towards the second device.

16. The secondary control entity according to claim 15, wherein the instructions further configure the secondary control entity to modify the relative priority information prior to the relative priority information being inserted in said resource control message.

17. The secondary control entity according to claim 15, wherein the instructions further configure the secondary control entity to obtain said relative priority information from a session description protocol (SDP) offer or answer contained in the session control message, said relative priority information being an attribute of a description of said stream contained in said SDP offer or answer.

18. The secondary control entity according to claim 15, wherein the instructions further configure the secondary control entity to:
receive the session control message containing a session description protocol (SDP) offer or answer, said SDP offer or answer containing an ordered list of descriptions of the media streams associated with said communication session;
obtain said relative priority information from a header of the session control message, said relative priority information being an ordered list of values contained in said header, the list being ordered in the same order as said stream descriptions associated with said communication session; and
on the basis of said ordered list of values and of the ordered list of descriptions of the media streams associated with said communication session, determine a relative priority for each of the media streams within said communication session according to the order of said lists.

* * * * *